United States Patent [19]
Fink

[11] Patent Number: 4,718,764
[45] Date of Patent: Jan. 12, 1988

[54] FREQUENCY AGILE SPECTROMETER

[75] Inventor: David Fink, Los Angeles, Calif.

[73] Assignee: Hughes Aircraft Company, Los Angeles, Calif.

[21] Appl. No.: 822,511

[22] Filed: Jan. 27, 1986

[51] Int. Cl.$^4$ .............................................. G01J 3/18
[52] U.S. Cl. ................................................ 356/328
[58] Field of Search ............... 372/102; 356/300, 320, 356/324, 326, 328, 331–334

[56] References Cited

U.S. PATENT DOCUMENTS

| | | | |
|---|---|---|---|
| 3,472,594 | 10/1969 | Hughes et al. | 356/320 |
| 4,200,846 | 4/1980 | Stark et al. | 372/102 |
| 4,238,141 | 12/1980 | Greiner | 372/102 |

FOREIGN PATENT DOCUMENTS 0150786  8/1985  European Pat. Off. ............ 356/334

OTHER PUBLICATIONS

Young, *IBM Technical Disclosure Bulletin*, vol. 8, No. 1, Jun. 1965, pp. 111 and 112.

Primary Examiner—F. L. Evans
Attorney, Agent, or Firm—Ronald L. Taylor; A. W. Karambelas

[57] ABSTRACT

An optical receiver system operative to allow a set of fixed positioned detectors in the same Dewar to be optically directed to concurrently sense any subset of a known set of spectral lines. The system also has a transmitter mode that allows a group of radiation sources having a subset of a possible set of spectral lines to be relatively optically overlapped at the transmitter aperture.

30 Claims, 5 Drawing Figures

FREQUENCY AGILE SPECTROMETER

BACKGROUND OF THE INVENTION

1. Field of the Invention

The invention relates generally to the field of transmit-receive laser-detector systems, and specifically to spectrometers that are frequency agile as to a given set of spectral lines.

2. Description of Related Art

Measuring the relative atmospheric plus target absorption of a set of spectral lines by a remote sensor or detector can be done sequentially (serially) or simultaneously (in parallel). The parallel approach is preferred in that transmitting the desired wavelengths simultaneously insures that the atmospheric turbulence is the same for all the wavelengths. If the sequential approach is used, the variation in atmospheric turbulence will cause the return signals to vary, which could be misinterpreted as a wavelength dependent absorption.

One typically wishes to transmit m wavelengths out of an available spectrum of n wavelengths. The returned signals at each of the m wavelengths must be individually measured by the receiver. The system must then be tuned to transmit and receive a different set of m wavelengths out of the available spectrum of n wavelengths. As a specific example, a remote chemical sensor may use $CO_2$ lasers to transmit and receive four (m=4) different $CO_2$ spectral lines in order to measure the relative atmospheric plus target absorption at the four wavelengths. At another point in time, a different set of four lines may be transmitted and the relative absorptions measured again. The subset of spectral lines transmitted may be selected from a set of approximately 70 (n=70) possible known and otherwise available $CO_2$ spectral lines in the spectrographic region from 9 to 11 microns with spectral separations between selected lines ranging anywhere from about 0.02 microns to 2 microns.

In the parallel mode, different embodiments have been suggested or used in the past. One prior art embodiment concerns the case where if only two spectral lines are concurrently in use at any given time (m=2), then polarization sharing of the transmitter area and polarization splitting of the received beams could be utilized, but this has the potential of introducing a systematic error into the measurement if the target reflectivity or atmospheric transmission is polarization sensitive, which generally is the case. It will be also noted that there is usually a large degree of, if not total, depolarization by the target, thereby precluding received signal separations.

In the transmittal mode, different parts of the aperture or different apertures for the different spectral lines could conceivably be used. Unfortunately, this acts to waste transmitter aperture by a factor of m for m spectral lines. For the received beam, all spectral lines necessarily use all parts of the aperture, thereby precluding use of this method for the receiver.

Another prior art receiver mode embodiment was to use a spectrometer to disperse the spectrum of the received signals and dedicate one detector element to each of the possible spectral lines, whether present or not, that is n detectors for n possible spectral lines, of which only m are used at any one time. This is relatively impractical particularly in regards to $CO_2$ lasers, not so much because of the number of detectors, but because of the range of wavelengths and the line-to-line spectral separation dictates a detector array about three centimeters long laid out along a curved focal plane. This array must then be cryogenically cooled and cold shielded, although the cold shielding will be relatively inefficient because it must be totally open in the direction of the array. The detectors are not equally spaced on the array, but must be spaced according to the exact wavelengths of the spectral lines and the diffraction grating dispersion equation. In addition, the large number of detectors on the curved focal plane means that several arrays of detectors rather than a few individually mounted detectors must be used, and the quality of each detector is not as good as with individual mounted detectors because each array must be either wholly accepted or rejected. It will also be appreciated that an additional problem concerns the need for n preamplifiers for n possible lines or using low signal level switching, and a method of getting all of the leads out of the package. The analogous transmitter solution would be to have n lasers for n possible lines, only m of which are used at any one time, which would have obvious disadvantages.

It will be appreciated that in a receiver system, one would like to utilize no more detectors than spectral lines transmitted and also have minimal loss of signal in the optics thereof. One way to accomplish this is to disperse the received signal and move a limited set of detectors to the focal spots of the constituent spectral lines. Under the prior art, the spectrum of the received energy can be dispersed with a diffraction grating, and the focal spots of the received spectral lines may be separated by spatial distances ranging from ½ mm to 4 cm for the $CO_2$ system, depending on exactly what combination of lines is transmitted. The linear dimensions can be magnified or demagnified by choice of optics focal lengths, but the range from farthest to closest spacings will remain at 40:1. At any given time, some or all of the spectral lines required may be adjacent, requiring the detectors to be separated by successive ½ mm spacings, or at any given time some lines may be widely separated, requiring the relevant detectors to be separated by 4 cm. Unless each of the detectors and its cryogenic cooler is only ½ mm in diameter, it is impossible to move the detectors to the appropriate locations. Even if the detectors could be so moved, or if a set of fixed detectors were used with articulated optical trains, the large, precise mechanical motions required would dictate a very complicated system. The large, mechanical motions would also drastically lengthen the time required to switch between sets of spectral lines. An analagous mechanical motion problem occurs with a transmitter system that combines m spectral lines from m sources into a common aperture by implementing a dispersive system backwards.

Yet another prior art embodiment is to use beamsplitters to break the received beam up into a number of beams equal to the number of spectral lines transmitted, and then use a diffraction grating and a single detector for each of the split-off beams. Each diffraction grating directs one of the known spectral lines onto its detector, and thus the rest of the energy in each split-off beam is lost. It will be appreciated that this is very inefficient in that an m-spectral line system suffers a loss of a factor of m.

The analogous transmitter solution would be to overlay the transmitters using beamsplitters, but this also throws away a factor of m in transmitter energy for a m-laser system.

What is needed is an invention that uses only m lasers and m detectors. The lasers are internally tuned to the desired set of m spectral lines and diffraction gratings are used to overlay the m laser beams onto a common output aperture. On the receiver end, a diffraction grating separates the m spectral lines and directs the m signals to only m detectors. This invention provides a practical and compact method of accomplishing both the transmit and receive functions.

SUMMARY OF THE INVENTION

It is an important object of the invention to provide an optical system whose receiver mode is operative to allow a set of fixed position radiation detectors to sense in parallel at the same point in time any given subset of a possible group of known spectral lines.

A further object of the invention is to provide a transmitter mode for the optical system that is operative to allow radiation sources (and in particular coherent sources) that operate on a subset of a possible set of spectral lines to be relatively optically overlapped at the aperture used for transmission.

Another object of the invention is to allow the optical system to function in a diffraction, reflection, and again in a diffraction mode with respect to radiation of various predetermined wavelengths so as to reach a given set of focal points in a manner that is wavelength independent.

A yet further object of the invention is to allow the first diffraction mode of the system to concurrently diffract the multiple predetermined wavelengths of radiation that are a finite subset at any given time of the possible set of known spectral lines.

Another further object of the invention is to allow the reflection mode of the system to be operative to reflect the subset of diffracted radiation from a corresponding plurality of reflective units, each unique to a wavelength in the possible set of known spectral lines, and further operative to be tilted in such a manner so as to reflect its assigned wavelength to a given focal point.

Yet another object of the invention is to allow the second diffraction mode of the system to be operative to concurrently diffract the multiple predetermined wavelengths of radiation to a given set of radiation detectors.

BRIEF DESCRIPTION OF THE DRAWINGS

Various other objects, advantageous, and meritorious features of the invention will become more fully apparent from the following specification, appended claims, and accompanying drawing sheets.

The features of a specific embodiment of the invention are illustrated in the drawings in which.

DETAILED DESCRIPTION OF THE INVENTION

Figure 1:
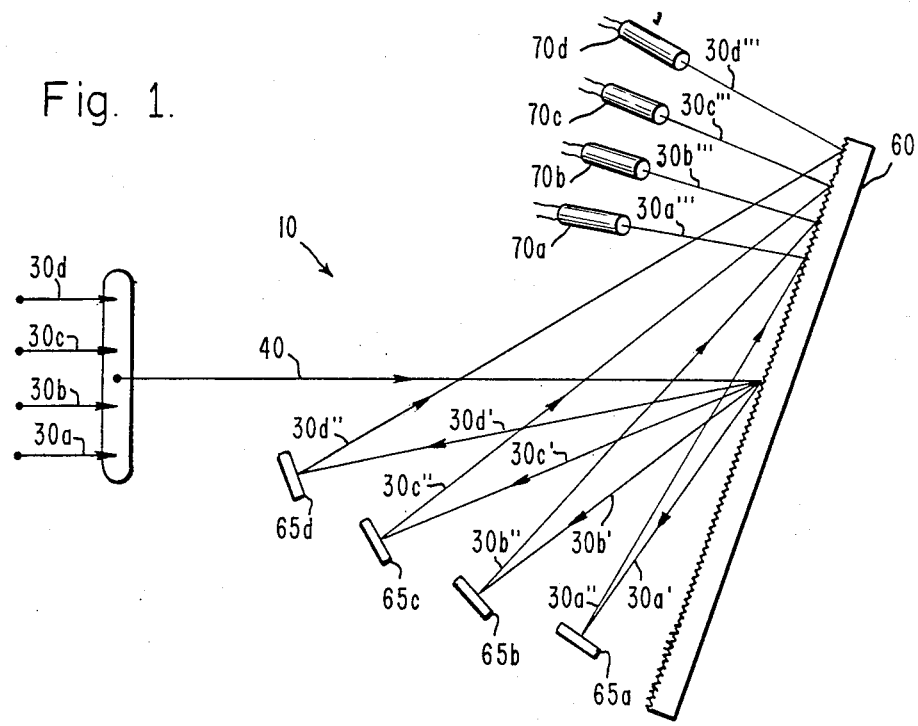
FIG. 1 is a schematic diagram of the optical system in its receiver mode.

Referring to FIGS. 1 through 5 by the characters of reference, there is illustrated in FIG. 1 an optical receiver system 10 for carrying out the objects of the invention.

The optical system as shown in FIG. 1 is presented with incident electromagnetic radiation composed of a group of four spectral lines $30a$–$d$ (from a source not shown) that have been chosen from a set of the seventy available known spectral lines for $CO_2$, each of which has a unique wavelength. The emissions $30a$–$d$ radiate collectively as a set on beam 40 to the relatively remote optical receiver 10. The collective beam 40 is received by the grating 60 where it is diffracted or dissembled into its original singular or unique wavelength beams $30a'$–$d'$ to the four operative tilted mirrors $65a$–$d$ respectively, of which there are a total of seventy in this embodiment, one for each available wavelength, although only four are shown for purposes of clarity. The reflected beams $30a''$–$d''$ from mirrors $65a$–$d$ are directed to the grating 60 for a second time where they are diffracted or reassembled as beams $30a'''$–$d'''$ to a set of optical detectors $70a$–$d$. The second diffraction is operative to remove the wavelength-dependent steering introduced by the first diffraction, so that the directions of the four beams $30a'''$–$d'''$ are determined only by the alignment directions of the four mirrors $65a$–$d$.

In particular, it will be appreciated that for the receiver 10, that if the mirrors $65a$–$d$ were set for exact retroreflection (not shown) with respect to the incoming diffracted lines $30a'$–$d'$, then the angle of diffraction of each of the reflected spectral lines $30a$–$d''$ would be dependent on its respective wavelength, and when reassembled, the spectral lines $30a'''$–$d'''$ would lie exactly on the original underdisposed beam 40. However, in the present embodiment as shown in FIG. 1, the mirrors $65a$–$d$ are tilted, each by a different amount. The directions of the components after reassembling $30a'''$–$d'''$ do not depend on their wavelengths, but just on the tilt introduced by the mirrors $65a$–$d$. This tilt may consist of two parts, mainly, a basic amount to deviate the beams out of the path of the original undispersed beam or lines $30a$–$d$, and then a small extra amount to differentiate between each of the different reflected spectral lines $30a'''$–$d'''$. The direction of the tilt of each of the mirrors $65a$–$d$ can also be out of the plane of the paper (not shown) so that the deviations of each of the reassembled beams $30a'''$–$d'''$ may also be out of the plane of the paper.

Figure 2:
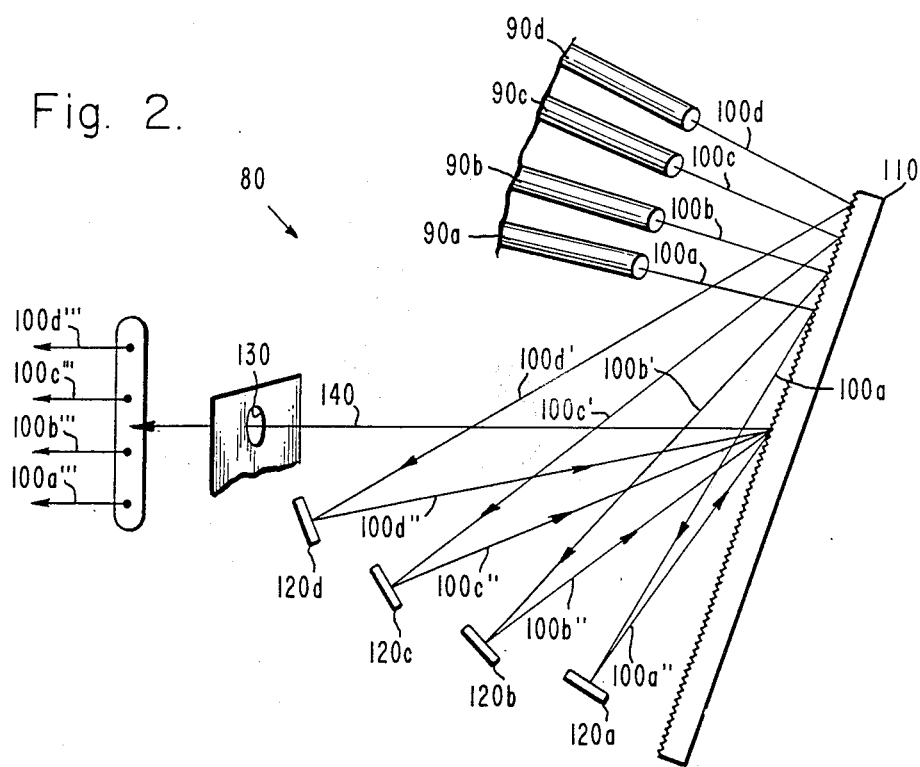
FIG. 2 is a schematic diagram of the optical system in its transmitter mode.

In FIG. 2, there is illustrated the optical system of the invention in its transmitter mode 80, which uses the same principles as the receiver system 10, but in reverse. The transmitter consists of a group of four $CO_2$ lasers 90 that have been set to spectral lines chosen from a set of seventy $CO_2$ unique spectral lines. The beams $100a$–$d$ output from the laser group $90a$–$d$ to the diffraction grating 110 where each is diffracted as one of the beams $100a'$–$d'$. Four operative tilted mirrors $120a$–$d$, of which there are seventy in this embodiment (only four are shown for purposes of clarity), act to receive the diffracted beams $100a'$–$d'$ for reflection. The received beams $100a'$–$d'$ are reflected by mirrors $120a$–$d$ as beams $100a''$–$d''$ to the grating 110 for a second time where they are diffracted or reassembled by grating 110 for outputting as collective beam 140 having therein the individual beams $100a'''$–$d'''$.

Figure 3:
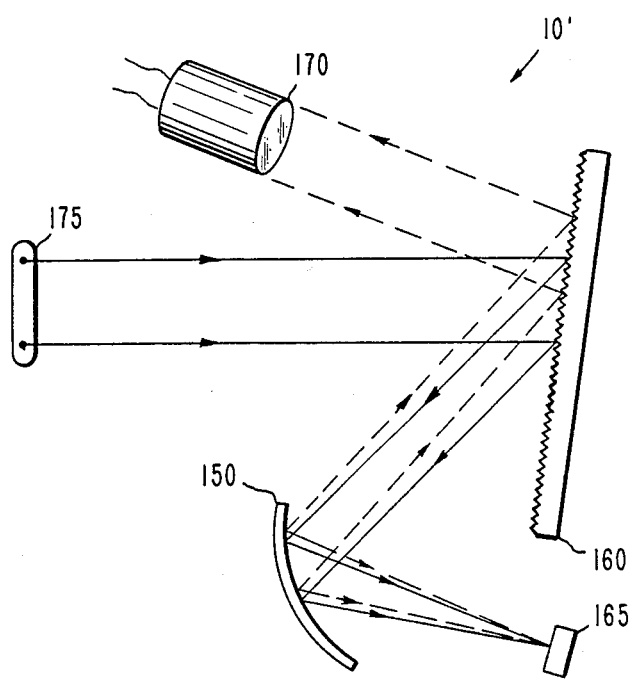
FIG. 3 is a schematic diagram with a curved focusing mirror interposed into the optical receiver system of FIG. 1.

Alternative embodiments include a receiver system 10', as shown in FIG. 3, with a flat grating 160, a tilted mirror 165 and detector 170 as before, but now also with an intervening curved focusing mirror or lens 150. Note that only one incoming spectral line 175 is shown for purposes of clarity as a result of the increased complexity of the structure. It will be appreciated that the intervening curved mirror acts to shorten the path required to separate the wavelength on line 175 from the other wavelengths (not shown) onto its own mirror 165.

Another embodiment, not shown, would be to direct the beams toward a second diffraction grating for reassembly instead of back to the original grating.

Figure 4:
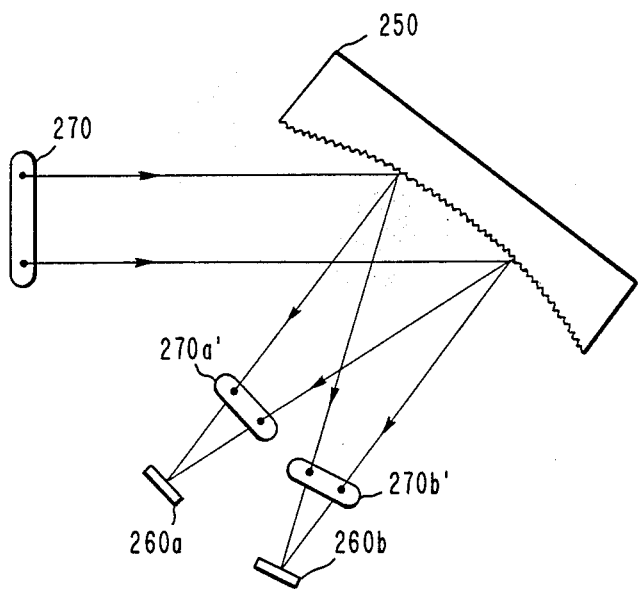
FIG. 4 is a schematic diagram with a curved diffraction grating substituted into the optical receiver system of FIG. 1.

In a very wide spectrum such as is the case for $CO_2$, a curved diffraction grating would probably be optimal, as shown in FIG. 4. In an exemplary mode, it would have a focal length of 25 cm that is, 50 cm radius of curvature, a diffraction grating 250 of about 150 lines/mm, and the aforementioned 70 mirrors, of which two 260-$b$ are shown in the figure, will cover an area of about 10 cm long by ½ mm wide, with each mirror 260$a$–$b$ about 178 mm across. The focal plane is a circle of 25 cm diameter, tangent to the curved grating 250. Because of the wide range of the diffracted angles, the grating 250 may be tipped out of plane or may be ruled with the grooves not perpendicular to the plane of the paper so diffracted beams 270$a'$–$b'$ and the mirrors 260$a$–$b$ are in front of the plane of the paper and do not obscure the incident undispersed beam 270; the mirror 260$a$–$b$ tip angles may be out of plane and the deviated and reassembled beams (not shown) may also be not in the plane of the paper.

For a system with as wide a spectrum as the $CO_2$ system in FIG. 4 noted supra, there may be a noticable variation in grating efficiency over the spectral range. In addition, the grating efficiency for reassembly may be different than it is for disassembly. The disassembly efficiency will probably vary from 0.95 to 0.75 over the range of the $CO_2$ spectrum. The reassembly efficiency, however, tends to be lower in the region with angles far from the undispersed beam, in which case a second grating (not shown) for reassembly may be used to increase efficiency.

It will be appreciated that even though the receiver mode was described for all the alternative embodiments of the invention, a transmitter mode that is the reverse of the receiver mode is also possible in a manner similar to that shown and described for FIG. 2. Some modifications may need to be made in some designs to allow for the much higher irradiance levels present in a transmitter as compared to a receiver. In particular, focusing a beam onto a mirror such as mirrors 165 and 260$a$–$b$ in transmitter versions of FIGS. 3 and 4, respectively, may destroy the mirror. In this case, the beam must be allowed to expand beyond the focus to a large enough size to reduce the irradiance to an acceptable level and then a mirror with a curvature matching that of the wavefront used to return the beam. (The beam could also be intercepted before the focus, but the different spectral lines are usually not spatially separated at that point.) Implementing the irradiance reduction may also require some other changes such as use of longer path lengths than in a receiver, because there must be room for the beams to expand without adjacent spectral lines becoming spatially overlapped again. A transmitter version of FIG. 3 that allows for this irradiance problem is shown in FIG. 5.

Figure 5:
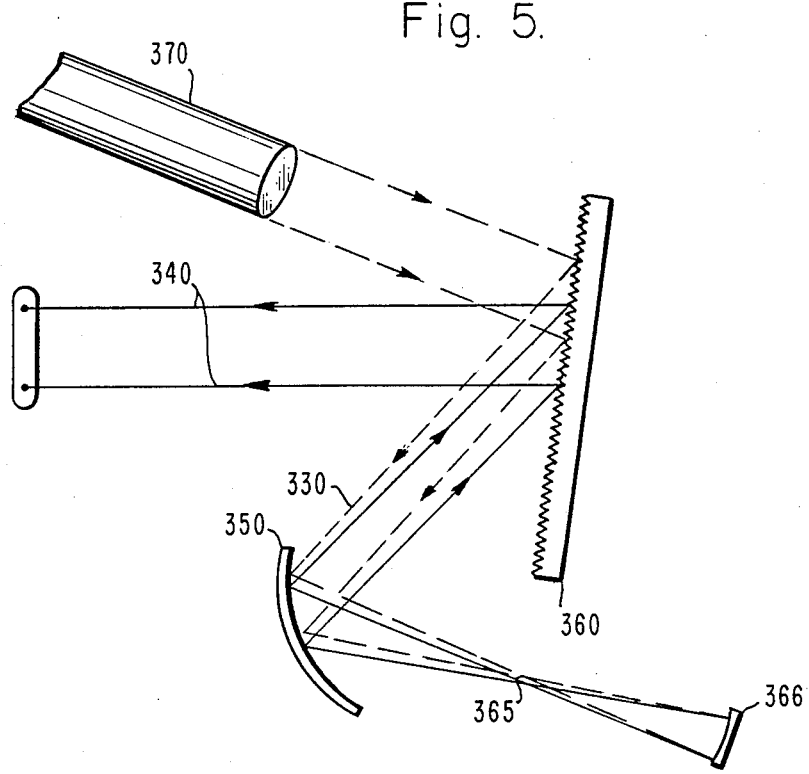
FIG. 5 is a schematic diagram of a transmitter version of the receiver shown in FIG. 3.

In FIG. 5, source 370, one of a plurality of sources (others not shown), illuminates diffraction grating 360. The diffracted light 330 reflects off focusing mirror 350 to focus at location 365. The beam then expands to mirror 366, of which there is one for each available spectral line (others not shown). Mirror 366 is tipped away from direct retroreflection as described earlier, and the reflected beam goes back to the diffraction grating, where it is directed along 340 toward the output aperture.

It will also be appreciated that although the preferred embodiment was described in terms of a $CO_2$ laser source, which has a wide spectrum, any form of radiation including coherent and noncoherent may be used.

It will be further appreciated that dispersive elements can include diffraction gratings and prisms. It will be also noted that reflective elements not only includes mirrors, but can also include transmission lenses and prisms.

While the above referenced embodiment of the invention has been described in considerable detail with respect to the system, it will be appreciated that other modifications and variations therein may be made by those skilled in the art without departing from the true spirit and scope of the invention.

What is claimed is:

1. A spectrometer with an arbitrarily programmable dispersion for a known set of electromagnetic spectral lines, comprising:
    (a) first dispersive means operative to receive a beam of radiation that is a subset of the set of spectral lines for disassembly in unique directions to a locus of predetermined areas for each of the lines;
    (b) tilted reflective means equal in number to the known set of spectral lines each of said reflective means positioned at a predetermined tilt orientation, said reflective means being operative to receive the disassembled lines from said first dispersive means at their respective predetermined areas for retransmission in a direction determined by said tilt of each of said reflective means; and
    (c) second dispersive means operative to receive each of the retransmitted lines from said reflective means at preselected separated areas of said second dispersive means for reassembly to a predetermined area that is wavelength independent.

2. The electromagnetic spectrometer according to claim 1 wherein said first dispersive means is a diffraction grating.

3. The electromagnetic spectrometer according to claim 1 wherein said reflective means is an array of mirrors.

4. The electromagnetic spectrometer according to claim 1 wherein said reflective means is an array of reflective elements.

5. The electromagnetic spectrometer according to claim 1 wherein said second dispersive means is a diffraction grating.

6. The electromagnetic spectrometer according to claim 4 further including curved mirror means for shortening the path required to separate each of the wavelengths of the disassembled lines before being presented to their respective reflective means and also for reduction of mirror spatial dimensions and length of said mirror array.

7. A receiver system for optically sensing a known set of spectral lines, comprising:

(a) first grating means operative to receive a beam of coherent radiation that is a subset of the known lines for diffraction to a locus of predetermined areas for each of the known lines;

(b) tilted mirror means numerically equivalent to the known lines, said mirror means positioned at a predetermined tilt orientation and with each of said mirror means being operative to receive the diffracted lines from said first grating means at their respective predetermined area for retransmission at an angle from the incident determined by said tilt of each of said mirror means;

(c) second grating means operative to receive each of the retransmitted lines from said mirror means for reassembling each to a predetermined point; and (d) detection means numerically equivalent to the reassembled lines and with each being operative to receive the reassembled lines from said second grating means for sensing each of the lines at its respective predetermined point that is wavelength independent.

8. The receiver system according to claim 7 wherein said first grating means is a diffraction grating.

9. The receiver system according to claim 7 wherein said mirror means is an array of mirrors.

10. The receiver system according to claim 7 wherein said second grating means is a diffraction grating.

11. The receiver system according to claim 7 wherein said detection means is a set of optical detectors.

12. The receiver system according to claim 7 further includes curved mirror means interposed between said first grating means and said mirror means for shortening the path required to separate each of the wavelengths of the diffracted lines before being presented to their respective mirror means and for reduction of the spatial dimensions of said mirror means.

13. A transmitter system for optically outputting a known set of spectral lines comprising:

(a) radiation means for generating beams at wavelengths that are a subset of the spectral lines;

(b) first diffraction means operative to receive the generated beams from said radiation means for dispersal to a locus of areas for each of the lines, said beams being directed to preselected separated areas of said first diffraction means;

(c) tilted mirror means numerically equivalent to the lines, each of said mirror means positioned at a predetermined tilt orientation and with each of said mirror means being operative to receive the dispersed lines from said first diffraction means at their respective area for reflection in a direction determined by said tilt of each of said mirror means; and (d) second diffraction means operative to receive each of the reflected lines from said mirror means for reassembly to a predetermined area that is wavelength independent.

14. The transmitter system according to claim 13 wherein said radiation means is an array of lasers.

15. The transmitter system according to claim 13 wherein said first diffraction means is a diffraction grating.

16. The transmitter system according to claim 13 wherein said mirror means is an array of mirrors.

17. The transmitter system according to claim 13 wherein said second diffraction means is a diffraction grating.

18. The transmitter system according to claim 13 further includes curved mirror means interposed between said first diffraction means and said mirror means for shortening the path required to separate each of the wavelengths of the dispersed lines before being presented to their respective mirror means.

19. An optical receiver for detecting a known set of spectral lines, comprising:

(a) first diffracting means operative to receive a beam of radiation that is a subset of the spectral lines for disassembly to a locus of predetermined areas for each of the lines;

(b) tilted mirror means numerically equivalent to the known set of spectral lines, said mirror means positioned at a predetermined tilt orientation and with each of said mirror means being operative to receive a disassembled line from said first diffracting means at their respective predetermined area for reflection at an angle determined by the tilt of each said mirror means;

(c) second diffracting means operative to receive each of the diffracted lines from said mirror means at preselected separated areas of said second diffracting means for reassembling each to a predetermined point; and (d) sensor means numerically equivalent to the reassembled lines and with each being operative to receive the reassembled lines from said second diffracting means for detecting each of the reassembled lines at its respective predetermined point that is wavelength independent.

20. The optical receiver according to claim 19 wherein said first diffracting means is a diffraction grating.

21. The optical receiver according to claim 19 wherein said mirror means is an array of mirrors.

22. The optical receiver according to claim 19 wherein said second diffracting means is a diffraction grating.

23. The optical receiver according to claim 19 wherein said sensor means are a set of optical detectors.

24. The optical receivers according to claim 19 further including curved mirror means interposed between said first diffracting means and said mirror means for shortening the path required to separate each of the wavelengths of the disassembled lines before being presented to their respective mirror means and for reduction of the size of said mirror means.

25. An optical transmitter for emitting a known set of spectral lines comprising:

(a) a plurality of laser means for outputting a beam of coherent radiation of wavelengths that are a subset of the known lines;

(b) first diffracting means operative to receive the outputting beam of coherent radiation from said laser means at preselected separated locations dependent on the frequency of said lines for disassembly to a locus of predetermined areas for each of the known lines;

(c) titled mirror means numerically equivalent to the known lines each of said mirror means positioned at a predetermined tilt orientation and with each of said mirror means being operative to receive the disassembled lines from said first diffracting means at their respective predetermined area for reflection in a direction determined by said tilt of each of said mirror means; and (d) second diffracting means operative to receive each of the reflected lines from said mirror means for reassembly to a predetermined area that is wavelength independent.

26. The optical transmitter according to claim 25 wherein said laser means is an array of lasers.

27. The optical transmitter according to claim 25 wherein said first and second diffracting means are at least one diffraction grating.

28. The optical transmitter according to claim 25 wherein said mirror means is an array of mirrors.

29. The optical transmitter according to claim 25 wherein said second diffracting means is a diffraction grating.

30. The optical transmitter according to claim 25 further including curved mirror means for shortening the path required to separate each of the wavelengths of the disassembled lines before being presented to their respective mirror means and for reduction of the size of said mirror means.

* * * * *